(12) United States Patent
Cromer et al.

(10) Patent No.: US 7,352,772 B2
(45) Date of Patent: Apr. 1, 2008

(54) MINIMIZATION OF PERFORMANCE IMPACT IN OVERLYING 802.11B AND 802.11G NETWORKS

(75) Inventors: Daryl Carvis Cromer, Apex, NC (US); Philip John Jakes, Durham, NC (US); Howard Jeffrey Locker, Cary, NC (US)

(73) Assignee: Lenovo Singapore Pte. Ltd., Singapore (SG)

( * ) Notice: Subject to any disclaimer, the term of this patent is extended or adjusted under 35 U.S.C. 154(b) by 808 days.

(21) Appl. No.: 10/742,028

(22) Filed: Dec. 19, 2003

(65) Prior Publication Data

US 2005/0135303 A1 Jun. 23, 2005

(51) Int. Cl.
*H04L 12/50* (2006.01)
(52) U.S. Cl. .................. 370/445; 370/447; 370/448
(58) Field of Classification Search .................. None
See application file for complete search history.

(56) References Cited

U.S. PATENT DOCUMENTS

| | | | |
|---|---|---|---|
| 5,378,067 A * | 1/1995 | Severson et al. | 709/237 |
| 6,816,502 B2 * | 11/2004 | Ekl et al. | 370/447 |
| 2002/0061031 A1 | 5/2002 | Sugar et al. | |
| 2002/0163933 A1 | 11/2002 | Benveniste | |
| 2002/0168979 A1 | 11/2002 | Walke et al. | |
| 2005/0030905 A1 * | 2/2005 | Luo et al. | 370/253 |

FOREIGN PATENT DOCUMENTS

| | | |
|---|---|---|
| WO | WO 02/13429 A1 | 2/2002 |
| WO | WO 03/041427 A1 | 5/2003 |

\* cited by examiner

*Primary Examiner*—Ronald Abelson
(74) *Attorney, Agent, or Firm*—Carlos Munoz-Bustamante (57) ABSTRACT

A wireless network access point is described which provides the resources of a backbone network to wireless clients. The access point is able to minimize the performance impact on 802.11g clients in the presence of mixed in 802.11g/802.11b traffic by isolating wireless network traffic based on protocol. At least one 802.11g timer is maintained for 802.11g traffic. Request for transfers by 802.11b clients which are blind to 802.11g traffic are delayed until after the expiration of the 802.11g timer. Traffic for 802.11g clients proceeds unimpeded while the 802.11g timer is active. A similar timer is optionally maintained for 802.11b traffic.

15 Claims, 6 Drawing Sheets

| Client 502 (MAC Address or Name) | Client Protocol 504 | Elapsed Time Since Last Request 506 (Time Stamp) |
|---|---|---|
| Name 1 | | |
| Name 2 | | |
| Name 3 | | |
| ... | | |
| Name n | | |

Fig. 6 ered. This invention, however, may be embodied in many different forms and should not be construed as limited to the embodiment set forth herein; rather, this embodiment is provided so that this disclosure will be thorough and complete, and will fully convey the scope of the invention to those skilled in the art.

MINIMIZATION OF PERFORMANCE IMPACT IN OVERLYING 802.11B AND 802.11G NETWORKS

BACKGROUND OF THE INVENTION

This invention pertains to wireless networking systems and, more particularly, to a wireless network access point which minimizes the performance impact of 802.11g clients in the presence of mixed in 802.11g/802.11b traffic by sequestering wireless network traffic based on protocol.

Within the past two decades, the development of raw computing power coupled with the proliferation of computer devices has grown at exponential rates. This phenomenal growth, along with the advent of the Internet, has led to a new age of accessibility to other people, other systems, and to information.

The simultaneous explosion of information and integration of technology into everyday life has brought on new demands for how people manage and maintain computer systems. The demand for information technology professionals is already outpacing supply when it comes to finding support for someone to manage complex, and even simple computer systems. As access to information becomes omnipresent through personal computers, hand-held devices, and wireless devices, the stability of current infrastructure, systems, and data is at an increasingly greater risk to suffer outages. This increasing complexity, in conjunction with a shortage of skilled information technology professionals, points towards an inevitable need to automate many of the functions associated with computing today.

Autonomic computing is one proposal to solve this technological challenge. Autonomic computing is a concept to build a system that regulates itself much in the same way that a person's autonomic nervous system regulates and protects the person's body.

Within the past decade, there has been accelerated growth in portable computing to meet the demands of a mobile workforce. This voluminous mobile workforce has traditionally relied on a cable connection to a backbone network in order to have access to resources such as printers, e-mail servers, databases, storage, and even Internet connections. Within the past few years alone, the industry has seen rapid deployment of wireless local area networks which offer increased convenience over cable connections to backbone networks. In addition to convenience, wireless networks offer the ability to roam while maintaining a network connection.

Recently, a standard for wireless local area networks known as the IEEE 802.11 standard has been adopted and has gained acceptance among the industrial, scientific and medical communities. The IEEE 802.11 standard for wireless networks is a standard for systems that operate in the 2,400-2,483.5 MHz industrial, scientific and medical (ISM) band. The ISM band is available worldwide and allows unlicensed operation of spread spectrum systems. The IEEE 802.11 RF transmissions use multiple signaling schemes (modulations) at different data rates to deliver a single data packet between wireless systems.

In a wireless local area network, wireless clients obtain access to resources on the backbone network through the use of an access point. The backbone network is typically on a wired network, such as ethernet, but can also be a second wireless network or any combination thereof. When an access point provides connectivity to resources directly on a wired network, the access point will contain, amongst other things, a wired LAN interface, a bridge function, and a wireless LAN interface in order to bridge traffic between the wireless network and the wired network.

Most installations use wireless local area networks as an overlay to an existing ethernet (cabled or wired) network which serves as a backbone or provides access to a backbone and its resources. Typically, access points are provided at various locations to create continuous geographical coverage for the wireless network. Since 802.11 is limited to 30 meters in range and Ethernet is physically limited to 100 meters in length, office environments typically deploy several access points on different backbones. The various wireless access points are assigned to different wireless frequency spectra or channels to allow overlap between wireless ranges.

802.11b is a popular IEEE wireless networking standard that has emerged and provides the aforementioned advantages. The new standard, 802.11g, is emerging which provides the advantages of 802.11b at a higher throughput which is on the order of ethernet wired local area network speed. As currently defined, 802.11g networks are backward compatible to 802.11b networks.

A problem exists, however, in that 802.11b traffic severely impacts 802.11g performance. 802.11b impacts performance of an 802.11g network because 802.11b clients are not able to recognize 802.11g traffic which follows the standard CSMA/CA physical carrier-sense protocol to avoid collisions. To subjugate this limitation, 802.11b clients must utilize a request to send/clear to send (RTS/CTS) virtual carrier-sense protocol to avoid collisions and to gain access to the channel for transmission. With only a few 802.11b users on an access point that supports both 802.11g and 802.11b traffic, overall throughput degrades such that any performance benefit of 802.11g disappears.

A challenge found, however, is in mitigating the impact introduced to one protocol from another protocol on the same access point according to autonomic computing principles.

SUMMARY OF THE INVENTION

It has been discovered that the aforementioned challenges are resolved by isolating traffic over the wireless network based on protocol. A timer is maintained for a first protocol wherein the timer corresponds to traffic on the wireless network which conforms to the first protocol. Request for transfers by clients conforming to a second protocol which is blind to the first protocol are delayed until after the expiration of the timer. Traffic for clients utilizing the first protocol proceeds unimpeded while the timer is active.

In a specific environment, a second timer is maintained for the clients conforming to the second protocol. The second timer corresponds to traffic conforming to the second protocol. In this embodiment requests for the channel by clients conforming to the first protocol are delayed until after the expiration of the second timer. During time the second timer is active, traffic for clients conforming to second protocol proceeds unimpeded.

BRIEF DESCRIPTION OF THE DRAWINGS

Some of the purposes of the invention having been stated, others will appear as the description proceeds, when taken in connection with the accompanying drawings, in which.

DETAILED DESCRIPTION OF THE ILLUSTRATIVE EMBODIMENTS

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in a specific embodiment," and similar language throughout this specification may, but do not necessarily, all refer to the same embodiment.

Figure 1:
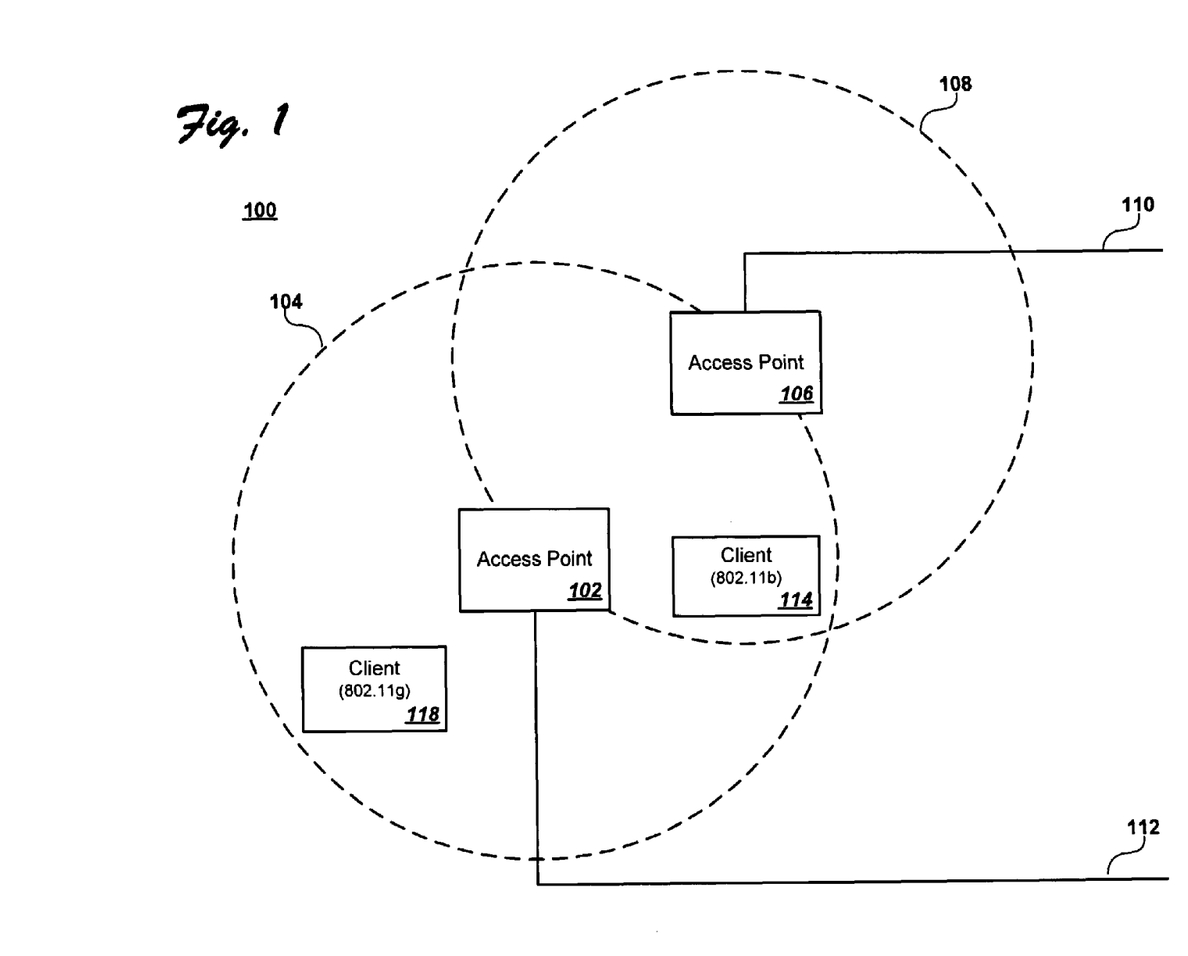
FIG. 1 depicts a scenario in which the concepts of the present invention are advantageous.

Referring now more particularly to the accompanying drawings, FIG. 1 depicts a scenario in which the concepts of the present invention are advantageous. Installation 100 consists of two access points 106 and 102 each having roughly circular geographical areas of coverage 108 and 104 respectively. Access points provide access to distributed resources and services via wireless medium for associated wireless clients or stations. Preferably, access points 106 and 102 contain IEEE 802.11 medium access control functionality and physical layer interface to the wireless medium. Wireless clients 114 and 118 are used here to represent a variety of wireless clients throughout installation 100. The wireless clients 114 and 118 are typically and preferably mobile computing units such as laptops and palmtops. As mobile units, clients 114 and 118 typically would not have printing capabilities nor other resources which would require hardware too large to hand carry. Such printing capabilities and other resources are found on backbone networks 110 and 112 which are coupled, according to installation 100, to two access points 106 and 102 respectively. Access points 106 and 102, in turn, provide the resources and services of the backbone network on to the wireless network in order to make the resources and services available to the wireless clients 114 and 118.

Backbone networks 110 and 112 provide installation 100 with the distributed resources and services. The resources and services include but are not limited to print servers and printers, e-mail servers, fax servers, database servers, and Internet access. Backbone networks 110 and 112 are preferably ethernet local area networks, optionally however, connections 110 and 112 can be wireless or optical distribution schemes to the same resources and services. In addition, backbone connections 110 and 112 can be bridge connections which in turn provide the resources and services of the backbone network.

Wireless clients 114 and 118 and are able to be configured in ad hoc mode and thereby engage in direct peer-to-peer data transfers and sharing of each other's resources when their respective signal strengths allow for direct connection. Otherwise, clients 114 and 118 are able reach each other through the backbone networks 110 and 112; in which case, their communications would be through the access points to which they are associated.

Figure 2:
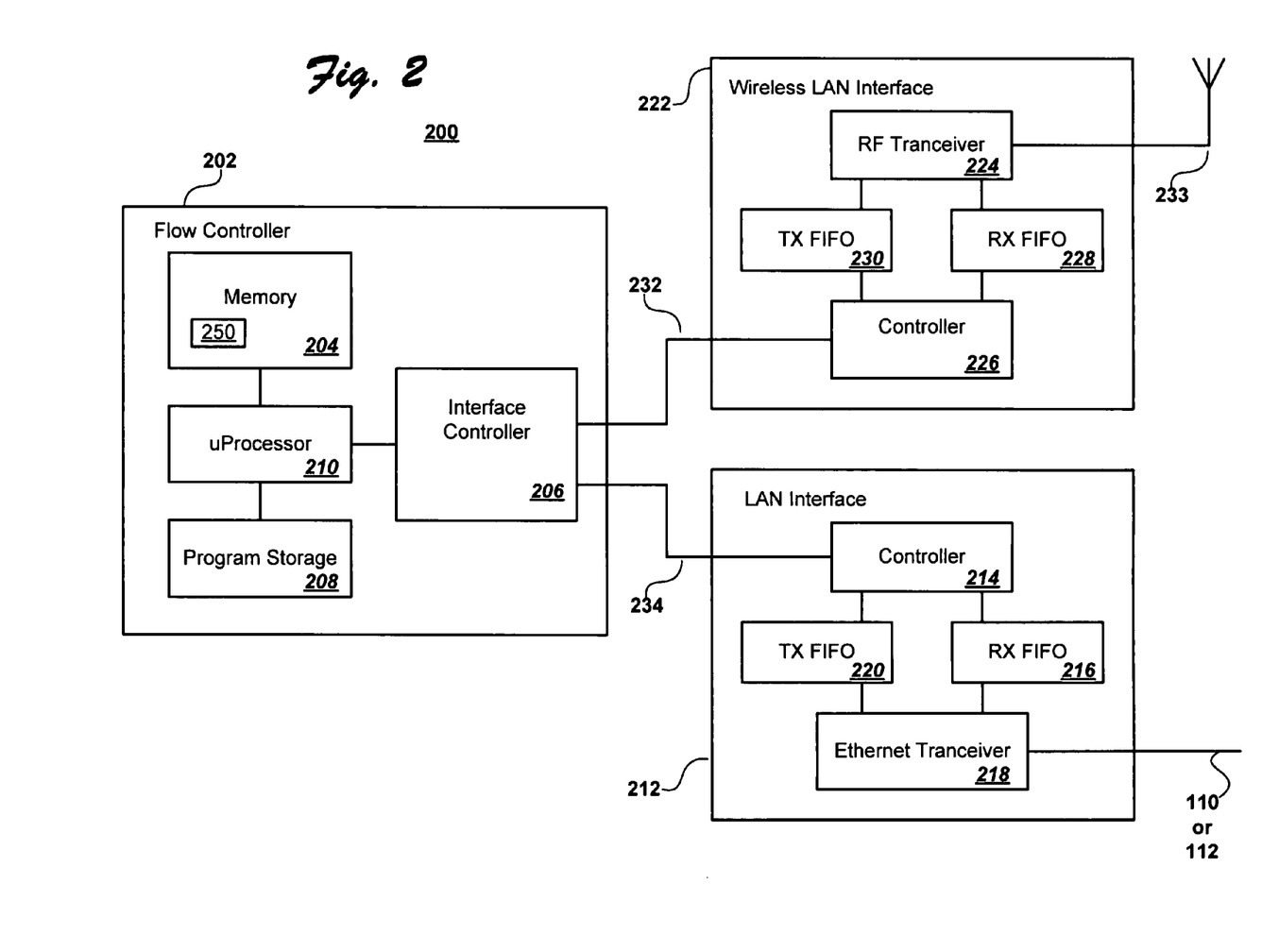
FIG. 2 is a block diagram of an access point configured according to an embodiment of present invention.

FIG. 2 is a block diagram of an access point configured according to an embodiment of present invention. Access point 200 includes wireless LAN interface 222, a bridge FIFO or flow controller 202, and a LAN interface 212. Wireless interface 222 can be any wireless interface using any wireless medium such as RF, infrared, VHF, UHF, and microwave. However, in the preferred embodiment, wireless LAN interface 222 is implemented as an 802.11 compliant wireless local area network interface. LAN interface 212 can be a wired land-based network interface, an optical network interface such as a fiber-optic network interface, or even a second wireless network interface. However, in the preferred embodiment, LAN interface 212 is implemented as an interface for an ethernet land-based network. LAN interface 212 typically connects to or bridges to a backbone network which provides resources and services. Wireless LAN interface 222 provides the resources and services found on the backbone network to wireless clients which are associated to wireless LAN interface 222.

The term—association—as used herein refers to that service which is used to establish access point to client mapping and enable client invocation of the resources and services found on the backbone network.

Bridge FIFO/flow controller 202 bridges and controls the flow of traffic between wireless clients coupled through wireless LAN interface 222 and the backbone network coupled to LAN interface 212. Flow controller 202 maintains a FIFO buffer for bidirectional traffic between interfaces 222 and 212. Flow controller 202 can be implemented entirely in hardware, or partially in hardware and partially in software/firmware. In the preferred embodiment as shown in FIG. 2 however, flow controller 202 is implemented with a microprocessor 210 having program storage 208 which stores boot code and microcode for execution on a microprocessor 210. The boot code is typically executed directly from program storage 208 while the microcode is typically transferred to memory 204 for faster execution. Flow controller 202 also includes an interface controller 206 which performs the lower-level functions including handshaking functions required across interface 232 to the wireless LAN interface 222 and across interface 234 to the LAN interface 212.

The construction of wireless LAN interface 222 includes a physical layer RF transceiver 224, transmit and receive FIFO's 230 and 228 respectively, and a low-level controller 226 for interfacing to the flow controller via interface 232. Wireless LAN interface 222 includes an antenna 233 for coupling electromagnetic energy to the atmosphere. Notice that the term—RF—is used herein as to be consistent with the IEEE 802.11 specifications. Throughout the IEEE 802.11 specifications the direct sequence spread spectrum (DSSS) system therein described targets an RF LAN system having a carried frequency in the 2.4 GHz band designated for industrial, science, and medical (ISM) applications as provided in the USA according to FCC 15.247. In other words, the actual modulation frequencies used by the RF transceiver 224 are in the 2.4 GHz microwave ISM band rather than in the frequency band traditionally known as "RF."

The construction of LAN interface 212 includes a physical layer ethernet transceiver 218, transmit and receive FIFO's 220 and 216 and a low-level controller 214 for interfacing to the flow controller via interface 234. Ethernet transceiver 218 is coupled to the backbone network 110 or 112.

Controller's 226 and 214 can be implemented in hardware, or as a combination of hardware and software/firmware components. In the preferred embodiment however, controllers 226 and 214 are implemented in hardware for faster operation.

Wireless LAN interface 222 and LAN interface 212 implement at least the physical and medium access control layers of the ISO LAN networking model. Higher ISO layers are implemented in the flow controller 202. However, it is possible to implement the higher layers of the ISO model in interfaces 222 and 212.

Further details concerning the construction and use of access point 200 shall be described in relation to the flow charts which follow. Certain details concerning the construction and use of access points are well known in the art and are omitted so as to not obfuscate the present disclosure in unnecessary detail.

Figure 3:
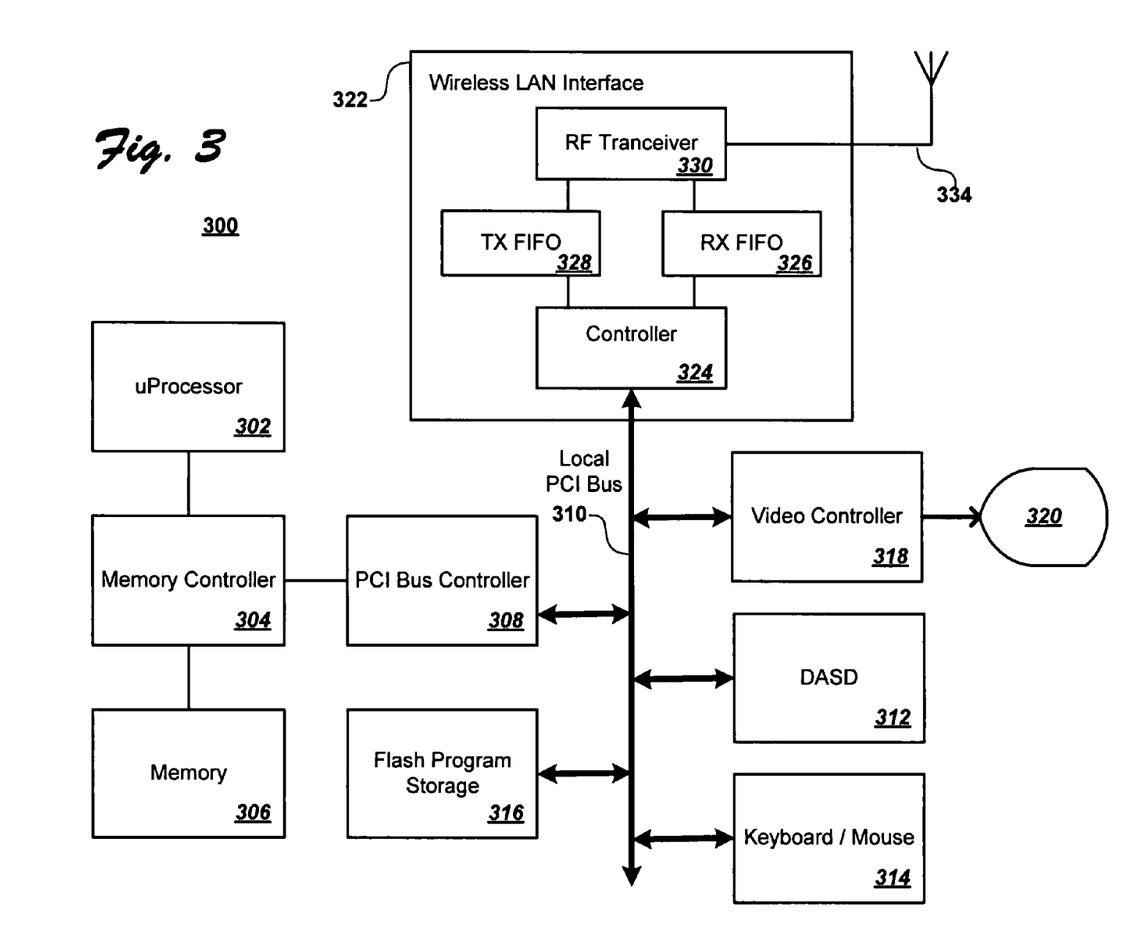
FIG. 3 is a block diagram of a client configured according to an embodiment of the present invention.

FIG. 3 is a block diagram of a client configured according to an embodiment of the present invention. The client 300 includes a physical layer RF transceiver 322, transmit and receive FIFO's 328 and 326 respectively, and a low-level controller 324 for interfacing to other components of client 300 through PCI bus 310. Wireless LAN interface 322 includes an antenna 334 for coupling electromagnetic energy to the atmosphere. Controller 300 further includes video controller 318 which provides control signals to video LCD display 320. PCI bus controller 308 operationally couples a variety of modules within client 300. A standard processing subsection is coupled to PCI bus controller 308 and consists of a microprocessor 302, a memory controller 304, and to memory 306. Microprocessor 302 receives its boot code from flash program storage 316 through PCI bus controller 308. A storage module 312 provides the client with DASD storage for storing application software and application data, and for storing and executing operating system code. Client 300 also includes a keyboard and mouse interface 314 which is coupled to PCI bus controller 308. Keyboard and mouse interface 314 accepts user input from a supplied keyboard and mouse. Establishing association and wireless connection to access point 200 according to the logic shown in FIG. 4, for which a detailed description shall be given in the description which follows, can be performed by controller 324 of wireless LAN interface 322 or by the microprocessor 302 and the controller 324. However in the preferred embodiment the association and wireless connection to access point 200 is implemented entirely in controller 324 according to logic depicted in FIG. 4.

While the invention is applicable to any wireless network wherein a plurality of wireless protocols including a physical carrier-sense protocol and a virtual carrier-sense protocol are supported and wherein the clients utilizing the virtual carrier-sense protocol are unable to detect the physical carrier-sense protocol, the specific example given which meets this criteria is for the case of 802.11b and 802.11g. For reference, in a mixed 802.11b/802.11g environment, 802.11b clients utilize the virtual carrier-sense protocol (RTS/CTS) in order to gain access and avoid collisions while 802.11g client's utilize the physical carrier-sense protocol (CSMA/CA).

Figure 4:
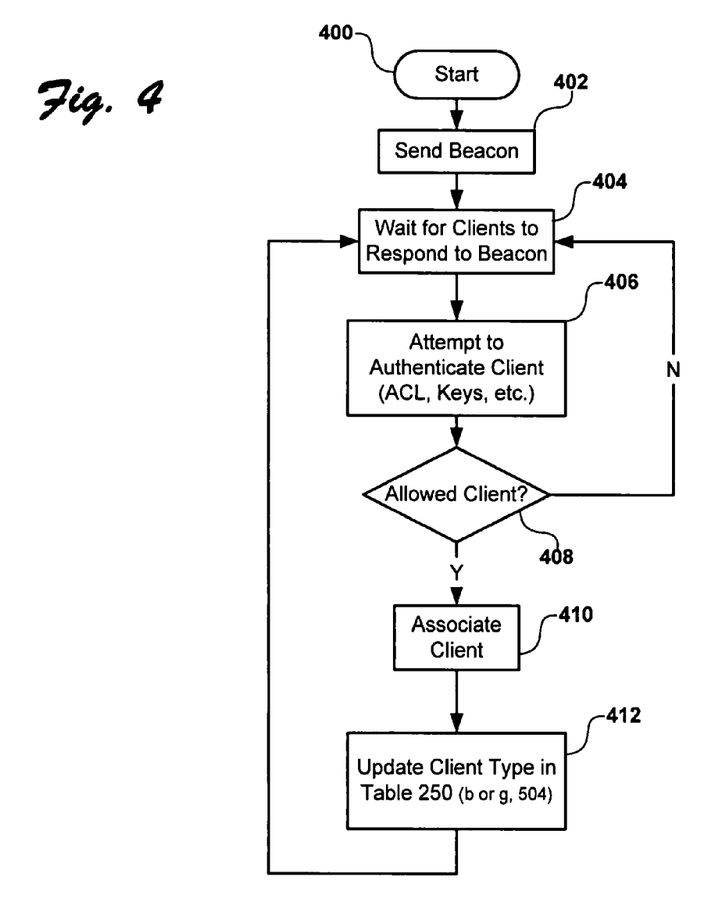
FIG. 4 is a flow diagram showing the logic exercised by the access point of FIG. 2 according to an embodiment of the present invention.

FIG. 4 is a flow diagram showing the logic exercised by the access point of FIG. 2 according to an embodiment of the present invention. Initially 400, the periodic transmission 404 of beacons identifying the access point 200 as available for association ensues. The process of association then continues by waiting 404 for clients to respond to the beacons. When a client responds, an attempt 406 to authenticate the client then ensues. The authentication can be made by an access control list (ACL), by using private/public keys, or by any other known authentication method. Typically, a simple access control list is used in which system administrators maintain a list of known clients which are permitted to associate to the backbone network. However, when a higher degree of security is needed, it is preferable to use a public/private key encryption method. A determination 408 is then made, resulting from the attempt 406 to authenticate, as to whether the client is to be associated. If the client is not to be associated, association is not executed and the access point 200 continues to wait 404 for clients to respond to a beacon. If the determination 408 is that the client is to be associated, the client is then associated. Table 250 of FIG. 2 is then updated 412 to reflect whether the associated client is an 802.11b or 802.11g client. The association 410, connection to the backbone network, and updating 412 is then complete and access point 200 continue to wait 404 for clients to respond to beacons.

Figure 5:
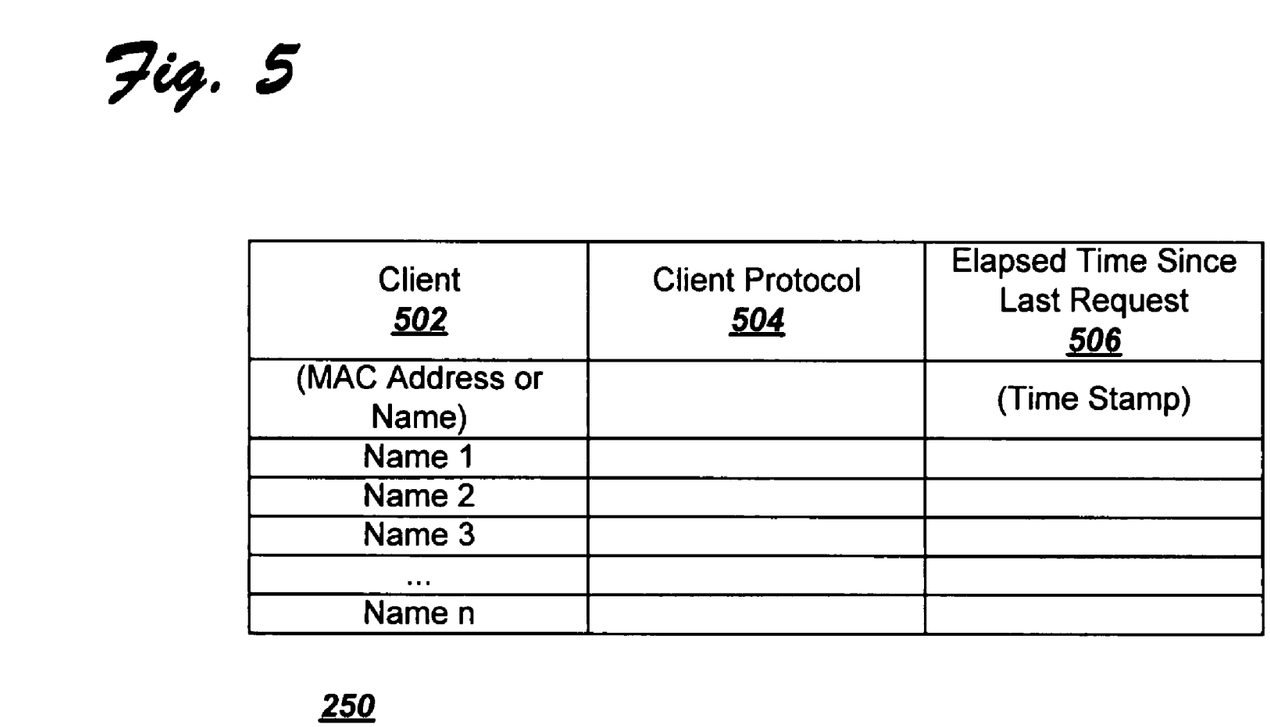
FIG. 5 is an illustration of the type of table that is maintained according to one embodiment of the present invention.

FIG. 5 is an illustration of the type of table that is maintained according to one embodiment of the present invention. Table 250 illustrated in FIG. 5 is maintained by access point 200 as an aid in determining which clients are to transmit data at any given point in time. The logic to be described in relation to FIG. 6 utilizes the data variables stored in table 250 in making client media access decisions. Table 250 is maintained in memory 204 of flow controller 202 found in FIG. 2.

Column 502, 504 and 506 of table 250 are reserved for maintaining a log of associated clients. As will be discussed in more detail in relation to the description of FIG. 6, column 502 of table 250 contains a unique identifier for the client which has associated to access point 200 for access to the backbone. The unique identifier can be the name, the MAC address, or the IP address of the requesting client. Column 504 contains entries for each client indicating whether the client is an 802.11b or 802.11g client. Column 506 contains an timer entry for each client which is representative of the time interval since the last request for the channel. Each such entry is considered a "timer." A value of zero in column 506 (the timer) for any particular client indicates that the client has no pending request. According to the present embodiment of the invention, the timer values 506 are maintained by an independent process (not shown) executed by microprocessor 210 of flow controller 202 of FIG. 2. Alternatively, the memory locations corresponding to column 506 can reference memory-mapped I/O wherein the timers 506 are implemented in hardware and accessed at those memory locations. The timers 506, whether implemented in software or hardware, are set and reset according to the discussion of FIG. 6 which ensues.

Figure 6:
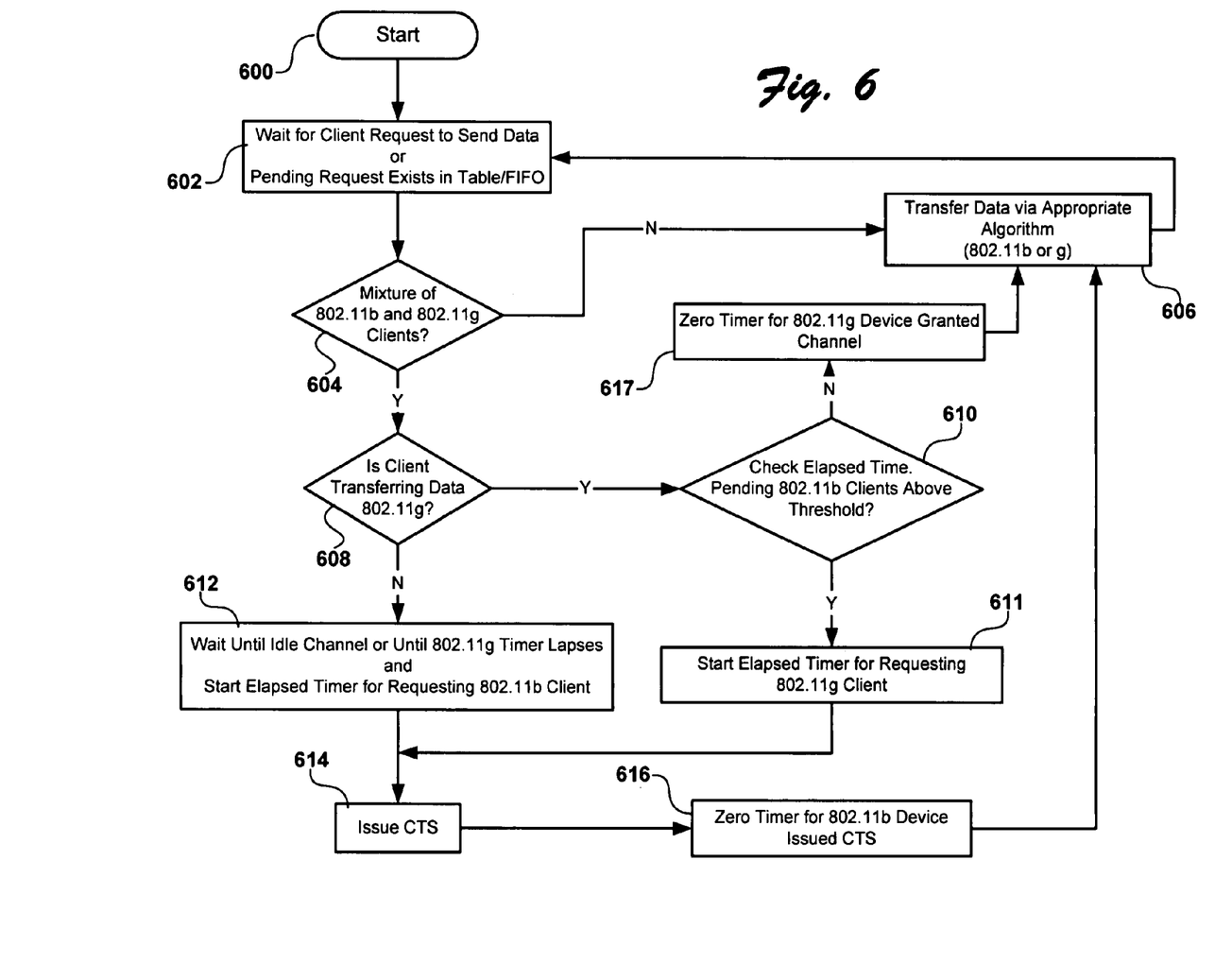
FIG. 6 is a flow diagram showing the logic exercised by the access point of FIG. 2 according to an embodiment of the present invention.

As a precursor to the discussion of FIG. 6, microprocessor 210 checks all clients of a particular protocol to determine whether any timer 506 values exceed a predetermined threshold. Since all timers 506 of a particular protocol are grouped in this fashion, the aggregate itself is considered a "timer." Thus, the aggregate determination for all timers 506 corresponding to 802.11g clients is heretofore referred to as the 802.11g timer (a.k.a. the physical timer/the CSMA/CA timer). Likewise, the aggregate determination for all timers 506 corresponding to 802.11b clients is heretofore referred to as the 802.11b timer (a.k.a. the virtual timer/the RTS/CTS timer). As will be seen, for 802.11b traffic, the 802.11g timer is checked, and vice versa; for 802.11g traffic, the 802.11b timer is checked.

The 802.11b and 802.11g timers establish a minimum time for which each protocol will receive continuous access to the channel. The minimum time for which each protocol will receive continuous access, as maintained by the two timers, do not necessarily alternate since idle time on the channel changes the overall behavior. However, as bandwidth utilization approaches 100 percent, the time allotted for each channel does tend to alternate. In the preferred embodiment, the amount time reserved for each of two protocols is set to vary according to the client population. In other embodiments, priority can be given to 802.11g by relatively increasing the minimum threshold for the 802.11g timer. Likewise for the 802.11b timer. Threshold values can be set anywhere from 600 microseconds to 3 milliseconds or higher, but no higher than the timeout specified for a particular channel.

Alternatively, entry 506 of table 250 may contain a result value indicating whether the interval since the last request exceeds the predetermined interval (whether the predetermined interval has elapsed). In this alternative embodiment, the logic to be described with respect to FIG. 6 need only checked the binary value of entry 506 for each client.

FIG. 6 is a flow diagram showing the logic exercised by the access point 200 of FIG. 2 according to an embodiment of the present invention. Referring now to FIG. 6 and to FIGS. 2 and 5, processor 210 of flow controller 202 maintains table 250 in memory 204 of access point 200. Processor 210 maintains columns 502 and 504 for each client requesting access through access point 200. In the preferred embodiment, processor 210 of flow controller 202 executes the logic illustrated in FIG. 6. However, other embodiments are envisioned in which logic of FIG. 6 is executed entirely in hardware or alternatively in some combination of hardware and software or firmware. Execution begins 600 by waiting 602 for clients to request to transfer data and by monitoring and controlling 602 pending requests maintained in a table or FIFO within memory 204 of flow controller 202. The pending requests are requests which have been cued from earlier attempts to transfer data. A determination 604 is then made as to whether access point 200 currently has a mix of 802.11b and 802.11g clients. If the determination 604 is that the clients currently associated to access point 200 are either all 802.11b or all 802.11g clients, then the data is transferred 606 as normal.

If the determination 604 is that there is a mixture of 802.11b and 802.11g clients then another determination 608 is made as to whether the present transfer is an 802.11g transfer. If it is not, it is presumed (in this example) that the client is an 802.11b client and access point 200 will wait 612 until there is no data flow pending or until the 802.11g timer has elapsed.

The 802.11g timer is considered to have elapsed when all entries in column 506 of table 250 which have a G indication in the corresponding column 504 entry have been checked/queried and any of entries 506 exceed the predetermined threshold set for 802.11g clients.

Simultaneously to wait 612, the timer entry 506 for the requesting client is reset and is started. While the request is waiting 612, the request is queued in the FIFO. When the 802.11g timer has elapsed, access point 200 issues 614 a clear to send (CTS) signal to the pending 802.11b client (to the first 802.11b client in the FIFO). Timer entry 506 is zeroed 616 and the data is transferred 606 via the appropriate algorithm, in this case 802.11b algorithm which uses the virtual carrier sense RTS/CTS protocol.

If the determination 608 is that the client is an 802.11g client, the 802.11b timer is checked 610 to determine if there are any pending 802.11b clients above the threshold set for 802.11b. Checking the 802.11b timer involves checking all entries in column 506 of table 250 which have a B indication in the corresponding column 504 entry. If any of the 802.11b timer entries 506 exceed the predetermined threshold set for 802.11b clients, the 802.11b timer is considered to have elapsed. If the determination 610 is that there are no pending 802.11b clients above the threshold (that the 802.11b timer has not elapsed or that there are no pending 802.11b clients), timer entry 506 is zeroed 617 for the appropriate 802.11g client and the data is transmitted 606 via the appropriate algorithm, in this case the 802.11g algorithm which uses the physical carrier sense CSMA/CA protocol. If the determination 610 is that there are pending 802.11b clients above the threshold (that the 802.11b timer has elapsed), timer entry 506 for the appropriate 802.11g client is reset and started and the 802.11g request is queued in the FIFO thereby allowing 802.11b traffic to continue by issuing 614 the CTS for 802.11b clients.

Thus, in one exemplary scenario 100 of FIG. 1, assume that a plurality of 802.11b clients and a plurality of 802.11g clients are actively engaging in data transfers and that there is contention for bandwidth. Assume also that client 114 is an 802.11b client and that client 118 is an 802.11g client and that both client 114 and 118 have issued requests for the channel. Assume also that access point 102 performs the logic shown in FIG. 6 according to the preferred embodiment of the present invention. Assume also that the channel is currently active in transferring 802.11g traffic. According to logic of FIG. 6, even if the request from 802.11b client 114 preceded the request from 802.11g client 118, the request from 802.11b client 114 will not disrupt the flow of 802.11g traffic and the request from 802.11g client 118 will be serviced prior to the 802.11b client 114 request when the 802.11b timer has not elapsed. In this scenario, the impact introduced to one protocol from another protocol on the same access point has been mitigated.

In the drawings and specifications there has been set forth a preferred embodiment of the invention and, although specific terms are used, the description thus given uses terminology in a generic and descriptive sense only and not for purposes of limitation.

We claim as our invention:

1. Apparatus comprising:
   a wireless network interface which supports a plurality of wireless protocols including a physical carrier-sense protocol and a virtual carrier-sense protocol, wherein the virtual carrier-sense protocol is utilized by provided clients which are unable to detect the physical carrier-sense protocol; and
   a flow controller which is coupled to said wireless network interface and which maintains a physical timer corresponding to traffic conforming to physical carrier-sense protocol, wherein the flow controller isolates traffic over said wireless network interface based on protocol by delaying virtual-carrier-sense-protocol traffic until after the physical timer elapses;
   wherein the physical timer commences in response to a first instance of physical-carrier-sense-protocol traffic following a first wireless network event and is set to elapse after a first predetermined amount of time, wherein the first wireless network event is selected from the group consisting of an idle network event and a virtual-carrier-sense-protocol traffic event.

2. Apparatus of claim 1 wherein the flow controller further maintains a virtual timer corresponding to traffic conforming to virtual carrier-sense protocol and further isolates traffic over said wireless network interface by delaying physical-carrier-sense-protocol traffic until after the virtual timer elapses.

3. Apparatus of claim 2 wherein the virtual timer commences in response to a first instance of physical-carrier-sense-protocol traffic following a second wireless network event and is set to elapse after a second predetermined amount of time wherein the second predetermined amount of time is selected from the group consisting of the first predetermined amount of time and an amount of time other than the first predetermined amount of time, and wherein the second wireless network event is selected from the group consisting of an idle network event and a physical-carrier-sense-protocol traffic event.

4. Apparatus comprising:
a wireless network interface which supports a carrier sense multiple access/collision avoidance (CSMA/CA) protocol and an 802.11b protocol, wherein the 802.11b protocol is utilized by provided clients which are unable to detect the CSMA/CA protocol; and
a flow controller which is coupled to said wireless network interface and which maintains a CSMA/CA timer corresponding to CSMA/CA traffic and an 802.11b timer corresponding to 802.11b traffic, wherein the flow controller isolates traffic over said wireless network interface based on protocol by delaying 802.11b traffic until after the CSMA/CA timer elapses and by delaying CSMA/CA traffic until after the 802.11b timer elapses;
wherein the CSMA/CA timer commences in response to a first instance of CSMA/CA traffic following a first wireless network event and is set to elapse after a first predetermined amount of time, wherein the first wireless network event is selected from the group consisting of an idle network event and a 802.11b traffic event.

5. Apparatus of claim 4 wherein the 802.11b timer commences in response to a first instance of 802.11b traffic following a second wireless network event and is set to elapse after a second predetermined amount of time wherein the second predetermined amount of time is selected from the group consisting of the first predetermined amount of time and an amount of time other than the first predetermined amount of time, and wherein the second wireless network event is selected from the group consisting of an idle network event and a CSMA/CA traffic event.

6. A method comprising:
maintaining a physical timer in relation to a wireless network which supports a plurality of wireless protocols including a physical carrier-sense protocol and a virtual carrier-sense protocol, wherein the virtual carrier-sense protocol is utilized by provided clients which are unable to detect the physical carrier-sense protocol and wherein the maintained physical timer corresponds to traffic which conforms to physical carrier-sense protocol; and
isolating traffic over the wireless network based on protocol by delaying virtual-carrier-sense-protocol traffic until after the physical timer elapses;
wherein the physical timer commences in response to a first instance of physical-carrier-sense-protocol traffic following a first wireless network event and is set to elapse after a first predetermined amount of time, wherein the first wireless network event is selected from the group consisting of an idle network event and a virtual-carrier-sense-protocol traffic event.

7. The method of claim 6 further comprising:
maintaining a virtual timer which corresponds to traffic which conforms to virtual carrier-sense protocol;
wherein said isolation of traffic further includes delaying physical-carrier-sense-protocol traffic until after the virtual timer elapses.

8. The method of claim 7 wherein the virtual timer commences in response to a first instance of virtual-carrier-sense-protocol traffic following a second wireless network event and is set to elapse after a second predetermined amount of time wherein the second predetermined amount of time is selected from the group consisting of the first predetermined amount of time and an amount of time other than the first predetermined amount of time, and wherein the second wireless network event is selected from the group consisting of an idle network event and a physical-carrier-sense-protocol traffic event.

9. A method comprising:
maintaining a carrier sense multiple access/collision avoidance (CSMA/CA) timer in relation to a wireless network which supports CSMA/CA and 802.11b protocols wherein the 802.11b protocol is utilized by provided clients which are unable to detect the CSMA/CA protocol and wherein the maintained CSMA/CA timer corresponds to CSMA/CA traffic on the wireless network;
maintaining an 802.11b timer which corresponds to 802.11b traffic;
isolating traffic over the wireless network based on protocol by delaying 802.11b traffic until after the CSMA/CA timer elapses and by delaying CSMA/CA traffic until after the 802.11b timer elapses;
wherein the CSMA/CA timer commences in response to a first instance of CSMA/CA traffic following a first wireless network event and is set to elapse after a first predetermined amount of time, wherein the first wireless network event is selected from the group consisting of an idle network event and a 802.11b traffic event.

10. The method of claim 9 wherein the 802.11b timer commences in response to a first instance of 802.11b traffic following a second wireless network event and is set to elapse after a second predetermined amount of time wherein the second predetermined amount of time is selected from the group consisting of the first predetermined amount of time and an amount of time other than the first predetermined amount of time, and wherein the second wireless network event is selected from the group consisting of an idle network event and a CSMA/CA traffic event.

11. A product comprising:
a computer usable medium having computer readable program code stored therein, the computer readable program code in said product being effective to:
maintain a physical timer in relation to a wireless network which supports a plurality of wireless protocols including a physical carrier-sense protocol and a virtual carrier-sense protocol, wherein the virtual carrier-sense protocol is utilized by provided clients which are unable to detect the physical carrier-sense protocol and wherein the maintained physical timer corresponds to traffic which conforms to physical carrier-sense protocol; and
isolate traffic over the wireless network based on protocol by delaying virtual-carrier-sense-protocol traffic until after the physical timer elapses;

wherein the physical timer commences in response to a first instance of physical-carrier-sense-protocol traffic following a first wireless network event and is set to elapse after a first predetermined amount of time, wherein the first wireless network event is selected from the group consisting of an idle network event and a virtual-carrier-sense-protocol traffic event.

12. The product of claim 11 wherein the code is further effective to:
maintain a virtual timer which corresponds to traffic which conforms to virtual carrier-sense protocol;
wherein said isolation of traffic further includes delaying physical-carrier-sense-protocol traffic until after the virtual timer elapses.

13. The product of claim 12 wherein the virtual timer commences in response to a first instance of virtual-carrier-sense-protocol traffic following a second wireless network event and is set to elapse after a second predetermined amount of time wherein the second predetermined amount of time is selected from the group consisting of the first predetermined amount of time and an amount of time other than the first predetermined amount of time, and wherein the second wireless network event is selected from the group consisting of an idle network event and a physical-carrier-sense-protocol traffic event.

14. A product comprising:
a computer usable medium having computer readable program code stored therein, the computer readable program code in said product being effective to:
maintain a carrier sense multiple access/collision avoidance (CSMA/CA) timer in relation to a wireless network which supports CSMA/CA and 802.11b protocols wherein the 802.11b protocol is utilized by provided clients which are unable to detect the CSMA/CA protocol and wherein the maintained CSMA/CA timer corresponds to CSMA/CA traffic on the wireless network;
maintain an 802.11b timer which corresponds to 802.11b traffic; and
isolate traffic over the wireless network based on protocol by delaying 802.11b traffic until after the CSMA/CA timer elapses and by delaying CSMA/CA traffic until after the 802.11b timer elapses;
wherein the CSMA/CA timer commences in response to a first instance of CSMA/CA traffic following a first wireless network event and is set to elapse after a first predetermined amount of time, wherein the first wireless network event is selected from the group consisting of an idle network event and a 802.11b traffic event.

15. The product of claim 14 wherein the 802.11b timer commences in response to a first instance of 802.11b traffic following a second wireless network event and is set to elapse after a second predetermined amount of time wherein the second predetermined amount of time is selected from the group consisting of the first predetermined amount of time and an amount of time other than the first predetermined amount of time, and wherein the second wireless network event is selected from the group consisting of an idle network event and a CSMA/CA traffic event.

* * * * *